United States Patent
Toda

(10) Patent No.: US 6,430,521 B1
(45) Date of Patent: Aug. 6, 2002

(54) VEHICLE HEADLAMP LEVELING DEVICE

(75) Inventor: Atsushi Toda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 140 days.

(21) Appl. No.: 09/642,715

(22) Filed: Aug. 21, 2000

(30) Foreign Application Priority Data

Sep. 9, 1999  (JP) ........................................... 11-255716

(51) Int. Cl.$^7$ ................................................ G01C 9/00
(52) U.S. Cl. ...................................... 702/150; 362/465
(58) Field of Search ........................ 702/150; 362/466, 362/276, 465, 460, 459; 315/82, 360

(56) References Cited

U.S. PATENT DOCUMENTS

| | | | |
|---|---|---|---|
| 6,183,118 B1 | * | 2/2001 | Toda et al. .................. 315/360 |
| 6,234,654 B1 | * | 5/2001 | Okuchi et al. .............. 362/276 |
| 6,305,823 B1 | * | 10/2001 | Toda et al. ................... 362/276 |

FOREIGN PATENT DOCUMENTS

| | | |
|---|---|---|
| DE | 197 43 670 A1 | 4/1999 |
| JP | Hei 2-45232 | 2/1990 |
| JP | Hei 10-230777 | 9/1998 |

OTHER PUBLICATIONS

Patent Abstracts of Japan, Publication No. 10230777 A, Published Sep. 2, 1998.

* cited by examiner

Primary Examiner—John S. Hilten
Assistant Examiner—Stephen J. Cherry
(74) Attorney, Agent, or Firm—Fish & Richardson P.C.

(57) ABSTRACT

An automatic headlamp leveling device is provided. The device comprises actuators 10 for tilting vertically optical light axes of headlamps, a vehicle speed sensor 12, a vehicle height sensor 14 provided on a suspension, a storage part 20 which stores data represented by a function that correlates outputs from the vehicle height sensor with relative pitch angles of a vehicle, and an operation control part 16 for controlling the driving of the actuators 10 based on the correlation function and an output from the vehicle height sensor 14.

11 Claims, 5 Drawing Sheets

VEHICLE HEADLAMP LEVELING DEVICE

FIELD OF THE INVENTION

The present invention relates to a vehicle headlamp leveling device for estimating a pitch angles of a vehicle in its longitudinal direction and automatically tilting the axes of headlamps to cancel the pitch angle.

BACKGROUND OF THE INVENTION

In a headlamp, a reflector, in which a light source is securely inserted, is tilted around a horizontal tilting shaft relative to the body of the headlamp. The optical light axis of the reflector (or the headlamp) is arranged to be tilted by an actuator around the horizontal tilting shaft.

When luggage is loaded in or unloaded from the vehicle or occupants in the vehicle get in or out while the vehicle is at a stop or stationary, the load acting on the vehicle changes and the pitch angle of the vehicle may change. However, in most cases, both the front and the rear of the vehicle sinks or is lowered. When a vehicle height at the rear (a distance between the axle and the body) detected with a vehicle height sensor provided on a rear suspension and a pitch angle are correlated, an approximate line can be estimated, with the assumption that the front of the vehicle is lowered. Then, a pitch angle can be calculated based on an output from the vehicle sensor and the estimated approximate line.

A conventional vehicle headlamp leveling device comprises a vehicle height sensor provided on either the left or right suspension of either the front or rear of the vehicle for detecting a distance between the axle and the body, a storage part in which a correlation function (an approximate line) between outputs from the vehicle height sensor and pitch angles of the vehicle is entered and set as control data, and an operation control part for controlling the driving of actuators based on an output from the vehicle height sensor. The control data (the approximate line) is stored in the storage part such that a predetermined inclined state of the optical light axes of the headlamps is maintained relative to a road surface.

When a load on the vehicle changes, the vehicle height sensor detects the change and outputs the change to the operation control part. The operation control part then calculates a vehicle pitch angle corresponding to the output from the vehicle height sensor based on the correlation function (the approximate line which is entered and set in advance) between outputs from the vehicle height sensor and pitch angles of the vehicle. The control part then drives the actuators (tilts the optical light axes of the headlamps) only to an extent corresponding to the calculated pitch angle.

The correlation function between outputs from the vehicle height sensor and pitch angles of the vehicle, which is stored in the storage part in advance, is specified by a single approximate line with the assumption that the vehicle is lowered also at the front. However, if luggage is put into a protruding section of the vehicle such as a trunk, the front of the vehicles rises (or lowers less) compare to the rear, and the actual pitch angle deviates far from the approximate line. Hence, an appropriate pitch angle of the vehicle cannot be obtained, and the headlamps cannot be appropriately leveled.

FIG. 2 is a chart showing a correlation between outputs from the vehicle height sensor (abscissa) and pitch angles of the vehicle (ordinate). D denotes that the driver is seated in the driver's seat, P denotes that the front passenger is seated in the front passenger seat, R denotes that a rear seat passenger is seated in the rear seat, and L denotes that luggage is loaded in the loading space such as a trunk (for example, a load of 100 kg). For example, DPR shows data taken when the driver, front sea passenger and rear seat passenger are seated in their respective seats. DPRRL shows data taken when the driver, front seat passenger and two rear seat passengers are seated in the respective seats with luggage loaded in the loading space to its given or maximum loading capacity. Furthermore, full loading (DPRRRL) shows data taken when the driver, front seat passenger and three rear seat passengers are seated in the respective seats with luggage loaded in the luggage space to its maximum loading capacity. Full loading (D) shows data taken when only the driver is seated in the driver's seat with luggage loaded to the maximum loading capacity.

In the conventional automatic headlamps leveling device, the correlation between outputs from the vehicle height sensor and pitch angles of the vehicle is specified by an approximate line (linear) designated by reference character A for use as control data, with the assumption that the front of the vehicle is lowered.

Although the correlation between outputs from the vehicle height sensor and pitch angles of the vehicle shows a characteristic of increasing linearly as shown in FIG. 2, there is variation of data in the direction of the ordinate axis. If the output from the vehicle height sensor shows −2 mm, the operation control part calculates an angle of 0.45 degree as the posture (the pitch angle) of the vehicle. This angle corresponds to an output of the vehicle sensor (−2 mm) derived from the approximate linear line designated by A. However, in actuality the vehicle posture (the pitch angle) of the vehicle should be about 0.6 degree (position DL in FIG. 2) but the operation control part controls the driving of the actuators to an extent that corresponds to the value of 0.45 degree and not 0.6 degree, as it should be.

SUMMARY OF THE INVENTION

An object of the invention is to provide a vehicle headlamp leveling device for enabling the compensation of optical light axes of headlamps of a vehicle with high accuracy by specifying two or more control lines (approximate lines stored in a storage part) with different slopes that correlates outputs from a vehicle height sensor and pitch angles of the vehicle. An optimum control line (approximate line) from the two or more control lines is selected based on a change in an absolute pitch angle obtained from an output of an auxiliary sensor. The auxiliary sensor detects the absolute pitch angle of the vehicle relative to a horizontal plane.

A vehicle headlamp leveling device according to a first embodiment of the invention comprises headlamps adapted to be driven by actuators such that light axes thereof are tilted up and/or down relative to the body of a vehicle, a vehicle speed sensor provided on the body, a vehicle height sensor provided either on a left or right suspension of either the front or rear of the vehicle for detecting a distance between an axle and the body, a storage part in which control data is entered and set in advance which comprises a correlation function between outputs from the vehicle height sensor and relative pitch angles of the vehicle relative to a road surface, and an operation control part for determining from an output from the vehicle sensor whether the vehicle is at a stop or moving and controlling the driving of the actuators based on an output from the vehicle speed sensor. The control data can be stored in the storage part. With the above embodiment, the optical light axes of the headlamps can stay in a predetermined inclined state relative to the surfaces of roads at all times. The control data in the storage part can be specified by at least two or more control lines that are inclined differently. An auxiliary sensor can be provided on the body for detecting an absolute pitch angle of the vehicle relative to a horizontal plane. The operation control part compares a difference between a variation added pitch angle, which is obtained by adding a variation in the absolute pitch angle to a relative pitch angle calculated from control lines previously selected, and a relative pitch angle calculated from respective control lines based on a current output of the vehicle height sensor. The control part then selects a control line with the smallest difference and controls the driving of the actuators based on a relative pitch angle calculated from the selected control line.

If the relative pitch angle calculated from the previously selected control line (the pitch angle of the vehicle determined previously) is assumed to be an accurate value, the variation added pitch angle, derived by adding the variation in the absolute pitch angle to the relative pitch angle, is also an accurate value. Consequently, among the relative pitch angles calculated from the respective control lines (approximate lines), a relative pitch angle closest to the variation added pitch angle approximates an actual pitch angle (an inclination) of the vehicle.

For example, as shown in FIG. 2, assume that the previously selected control line is B and that the output from the auxiliary sensor is $\Delta\theta$. The variation added pitch angle ($\theta B+\Delta\theta$), obtained by adding $\Delta\theta$ and the pitch angle $\theta B$ calculated from the control line B (the previous pitch angle of the vehicle), is compared with pitch angles $\theta b$, $\theta c$ calculated from the control lines B, C, respectively, based on a current output of the vehicle height sensor. Whichever of the two pitch angles $\theta b$, $\theta c$, closer to the variation added pitch angle ($\theta B+\Delta\theta$) is also closer to the actual incline of the vehicle.

That is, differences between the variation added pitch angle ($\theta B+\Delta\theta$) and the pitch angles $\theta b$, $\theta c$ calculated from control lines B, C based on the output from the vehicle sensor this time are obtained, respectively. The control line B (or C) of the control lines that shows a smaller difference is selected as a control line more appropriate for determining the current correlation. The driving of the actuators is controlled based on the relative pitch angle calculated using this selected control line B (or C).

According to a second embodiment of the invention, a vehicle headlamp leveling device has a vehicle height sensor provided on one of the rear suspensions, and a control data comprises two control lines representing two cases where a load is placed in a rear overhang portion such as a trunk and where no load is placed, respectively.

Assume luggage is placed in the overhang portion such as the trunk with the vehicle height sensor provided on the rear suspension. Since the front of the vehicle is lowered less compared to when no load is placed, the correlation between outputs from the vehicle height sensor and pitch angles of the vehicle can be specified by two correlation functions represented by a control line (an approximate line) corresponding to luggage placed in the rear and a control line (an approximate line) corresponding to no luggage.

In addition, the first and second embodiment are premised on the leveling (the compensation of the optical light axes) of the headlamps based on pitch angle data taken from a vehicle at a stop. The pitch angle data of a stationary vehicle would be more accurate than those of a moving vehicle to an extent that there are fewer factors that perturb a stationary vehicle. Thus, since the actuators are controlled based on the more accurate pitch angle data, the automatic headlamps leveling can also be accurate to that extent.

According to a third embodiment of the invention, a vehicle headlamp leveling device has an operation control part adapted to control the actuators when the vehicle is moving stably. The control is based on a relative pitch angle calculated from a last selected control line of the vehicle at a stop. A vehicle is defined as moving stably if it runs at a speed that is equal to or greater than a given value and runs with an acceleration that is equal to or smaller than a given value.

If the automatic leveling of headlamps is limited only to stationary vehicles, inappropriate pitch angle data collected, for example, while the vehicle is parked on a slope or with a wheel or wheels riding on a curb, may be used to level the headlamps (compensate the optical light axes). An inappropriate leveling of the headlamps can be avoided by controlling the actuators based on pitch angle data detected when the vehicle is running stably, a condition that approximates the vehicle at a stop.

According to a fourth embodiment of the invention, a vehicle headlamp leveling device has an operation control part and a storage part constructed as part of an ECU. The ECU comprises CPU, RAM and ROM, and an auxiliary sensor.

The incorporation of the auxiliary sensor into the ECU reduces the number of constituent components of the automatic headlamps leveling device.

DETAILED DESCRIPTION OF THE INVENTION

Figure 1:
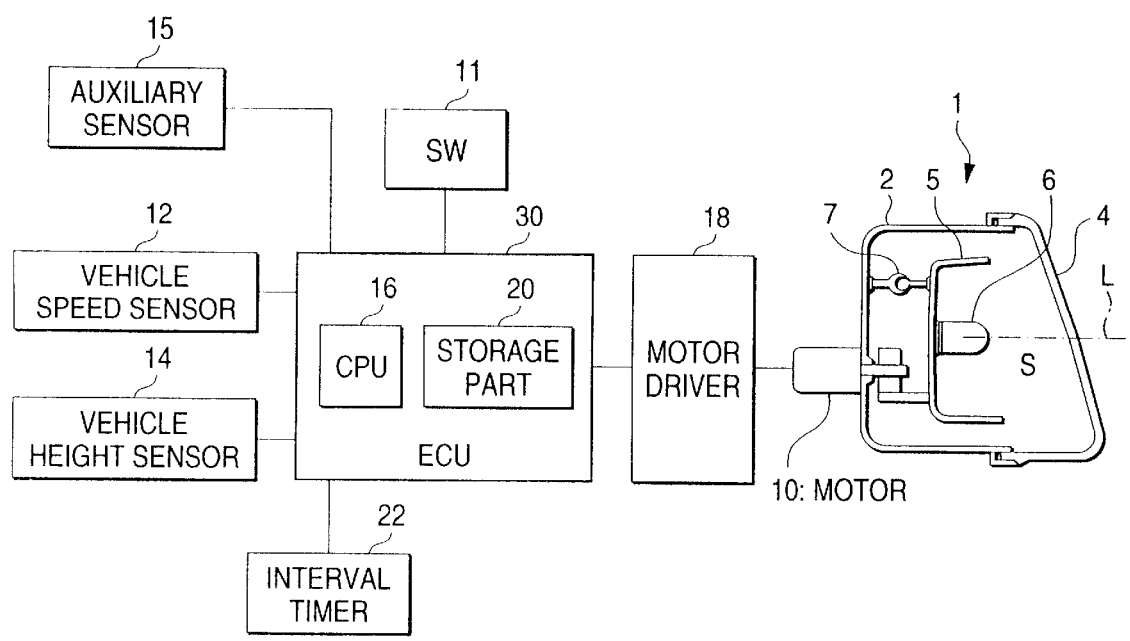
FIG. 1 is a diagram showing a vehicle headlamp leveling device according to an embodiment of the invention.
Figure 2:
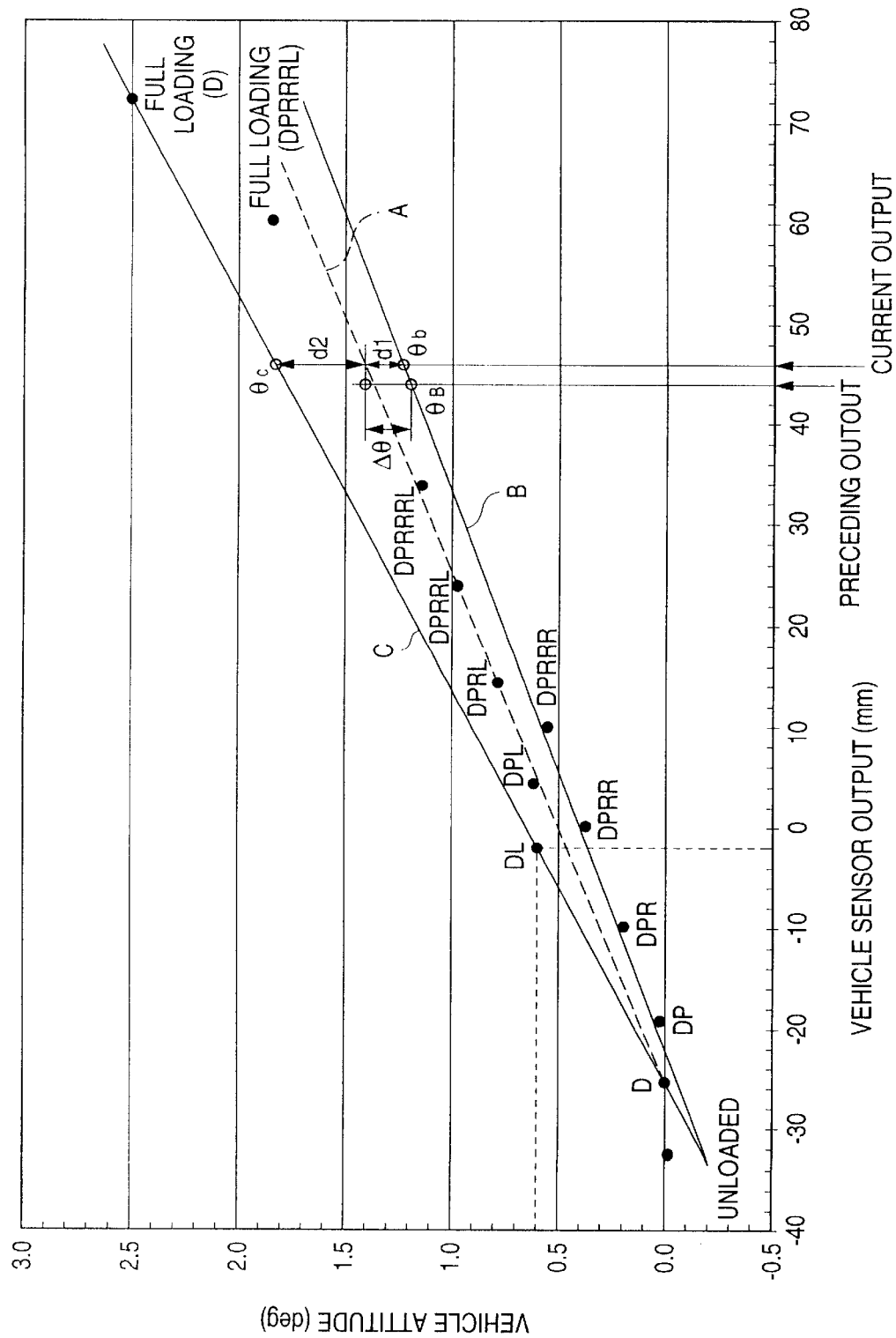
FIG. 2 is a chart showing correlations between outputs from a vehicle height sensor and postures (pitch angles) of a vehicle.
Figure 3:
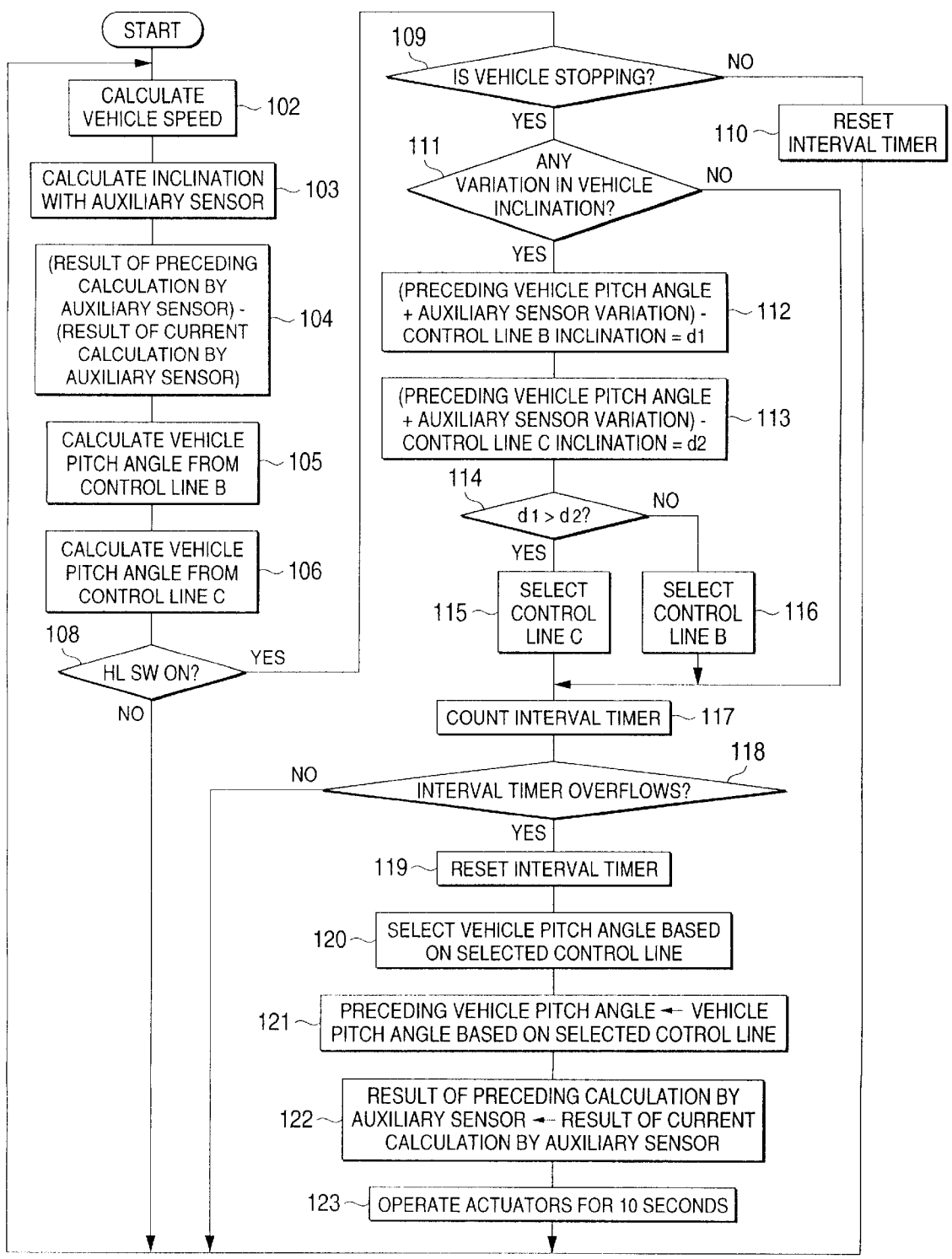
FIG. 3 is a flowchart showing a process flow of motor control by a control part of the vehicle headlamp leveling device according to an embodiment of the invention.

FIGS. 1 to 3 show one embodiment of the invention. FIG. 1 is a diagram showing the overall construction of a vehicle headlamp leveling device according to a first embodiment of the invention. FIG. 2 is a chart showing correlations between outputs from a vehicle height sensor and postures (pitch angles) of a vehicle. FIG. 3 is a flowchart showing a process flow of the motor driving control by a CPU which is an operation control part of the device.

Reference numeral 1 in FIG. 1 denotes a vehicle headlamp, and a frontal lens 4 is assembled to a front opening of a lamp body 2 to thereby provide a lamp compartment S. A parabolic reflector 5 having a bulb 6 as a light source securely inserted therein is supported in the lamp compartment S in such a manner as to tilt around a horizontal tilting shaft (a shaft normal to the surface of the diagram of FIG. 1) 7, and the reflector is also constructed so as to be tilted up and/or down for adjustment by a motor 10 which is an actuator.

The automatic leveling device for the headlamp 1 comprises the motor 10 which acts as an actuator for tilting in vertical directions for adjustment the light axis L of the headlamp 1, a lighting switch 11 for the headlamp 1, a vehicle speed sensor 12 which is a vehicle speed detecting means for detecting the speed of the vehicle, a vehicle height sensor 14 partially constituting a vehicle pitch angle (a pitch angle of the vehicle relative to the road surface) detecting means, an auxiliary sensor 15 comprising a gyro for detecting the absolute pitch angle of the vehicle (a pitch angle relative to the horizontal), a CPU 16 which is an operation control part which is adapted to determine the operation of the headlamp 1 or whether the headlamp 1 is turned on or off and the operation of the vehicle or whether the vehicle is running or at a stop based on a signal from the vehicle speed sensor 12, to calculate a relative pitch angle of the vehicle based on a signal from the vehicle height sensor 14, a signal from the auxiliary sensor 15 and control data entered and set in a storage part 20 and to output based on this relative pitch angle data so calculated a control signal for driving the motor 10 to a motor driver 18, the storage part 20 for storing the pitch angle data of the vehicle detected by the vehicle height sensor 14 and the auxiliary sensor 15 and calculated by the CPU 16 and specifying a correlation between outputs from the vehicle height sensor and pitch angles of the vehicle, and an interval timer 22 for setting timings at which the motor 10 is driven.

The storage part 20 comprises a RAM storing various types of data, a ROM storing a control program, and a backup ROM. The CPU 16 and the storage part 20 are integrated together with input and output circuits as an ECU (Electronic Control Unit) 30 which is a logical operation circuit unit.

When a signal from the vehicle height sensor 12 is entered thereinto, the CPU 16 determines whether the vehicle is being at a stop or running based on the signal so entered, and controls the actuators 10 so as to be driven at certain intervals only when the vehicle is at a stop.

In addition, when a signal is entered into the CPU 16 from the vehicle height sensor 14, the CPU 16 calculates the tilt in the longitudinal direction (a relative pitch angle relative to the road surface) of the vehicle from the signal so entered which corresponds to the displacement of the suspension. In the vehicle shown in this embodiment, a one-sensor system is adopted in which the vehicle height sensor 14 is provided only on the rear right suspension, whereby the pitch angle of the vehicle can be estimated from a variation in vehicle height detected by the vehicle height sensor 14. Then, when a signal is entered thereinto from the auxiliary sensor 15, the CPU 16 calculates an optimum relative pitch angle based on the control data set in the storage part 20 and outputs to the motor driver 18 such that the light axis L is tilted a predetermined amount in a direction in which the pitch angle so calculated is cancelled.

As shown in FIG. 2, the correlation between outputs (mm) from the vehicle height sensor 14 and pitch angles (degree) of the vehicle is entered and set in the storage part 20 as a form specified by two control lines (approximate lines) B, C having different inclinations. The control line C is a linear expression having as a reference a position where the pitch angle of the vehicle when only the driver rides therein becomes zero and adapted to deal mainly with a case where luggage is loaded into the vehicle, whereas the control line B is a linear expression whose inclination is slightly smaller than that of the control line C and adapted to deal mainly with a case where no luggage is loaded into the vehicle.

The CPU 16 is designed to compare differences between a variation added pitch angle and relative pitch angles $\theta b$, $\theta c$ calculated from the respective control lines B, C based on the current output from the vehicle height sensor 14. The variation added pitch angle is obtained by adding the variation $\Delta\theta$ in the absolute angle of the vehicle obtained from the auxiliary sensor 15 to a relative pitch angle (the previous pitch angle) calculated from the control line selected previously. The CPU 16 then selects one of the control lines B, C that has the smaller difference, and controls the actuators 10 based on the relative pitch angle calculated from the selected control line B (or C).

For example, assume that the control line selected previously is B, and that the output from the auxiliary sensor 15 is $\Delta\theta$. If the variation added pitch angle $(\theta B+\Delta\theta)$ obtained by adding the output $\Delta\theta$ from the auxiliary sensor 15 to the pitch angle (the previous pitch angle of the vehicle) $\theta B$ calculated from the control line B and the pitch angles $\theta b$, $\theta c$ calculated from the control lines B, C based on the current output from the vehicle height sensor 14 are compared with each other, respectively, one of the two pitch angles $\theta b$, $\theta c$ closer to the variation added pitch angle $(\theta B+\Delta\theta)$ is closer to the actual inclination (the relative pitch angle) of the vehicle.

Consequently, the CPU 16 is designed to obtain differences between the variation added pitch angle $(\theta B+\Delta\theta)$ and the pitch angles $\theta b$, $\theta c$ calculated from the control lines B, C based on the current output from the vehicle height sensor 14, respectively. The CPU 16 selects the control line B (or c) of the two control lines which provides a smaller difference as an appropriate current control line for the correlation determined, and controls the driving of the motors 10 based on the relative pitch angle calculated using the control line B (or C) so selected.

In addition, the storage part 20 is a part for storing pitch angle data detected by the vehicle height sensor 14 and the auxiliary sensor 15 and calculated by the CPU 16. A storage portion of the storage part 20 stores 10 pieces of Data D1 to D10 samples for one second at intervals of 100 ms. A new piece of data can be taken into the storage portion every 100 ms, while the oldest piece of data is discarded at such a time interval (old data is sequentially replaced with new data). Moreover, the vehicle pitch angle data detected previously is never deleted and is held stored in the storage part 20.

The CPU 16 determines whether the lighting switch 11 is switched on or off, and outputs to the motor driver 18 so as to drive the motors 10 only in a case where the lighting switch 11 is switched on.

Furthermore, for a vehicle at a stop, the CPU 16 outputs to the motor driver 18 that drives the motors 10 when a predetermined time interval set in the interval timer 22 has elapsed.

The tiltable range of the headlamp 1 is fixed, and therefore, a maximum driving time of the motor 10, required for leveling the headlamp once, is fixed. Then, if the interval (time) at which the motor is driven is shorter than the maximum driving time of the motor 10 required to level the headlamp once, the motor 10 has to follow the change in vehicle posture (pitch angle) that can occur every time occupants of the vehicle get in or out. Thus, the motor 10 would have to be driven frequently, repeatedly rotating clockwise and counterclockwise and stopping. The light axis L may never reach a target position. The constant driving of the motor 10 may lead to reduce its life.

To address this issue, the interval at which the motor is driven can be set longer (for example, 10 seconds) than the maximum driving time of the motor 10 which is needed to carry out once the leveling of the headlamp, so that the target position of the light axis does not change during the leveling of the headlamp (during the driving of the motor).

With reference to a flowchart shown in FIG. 3, how the CPU 16 drives the motors is described.

At Step 102, a vehicle speed is calculated from an output from the vehicle speed sensor 12. At step 103, an absolute pitch angle is calculated from an output from the auxiliary sensor 15. At step 104, a difference is calculated between the absolute pitch angle detected at the previous pitch angle (the absolute pitch angle detected previously which is stored in the storage part 20) and the absolute pitch angle detected this time. Then, at steps 105, 106, vehicle pitch angles $\theta b$, $\theta c$ based on the control lines B, C are calculated from the current output outputted from the vehicle height sensor 14. The flow then moves to step 108.

At step 108, whether or not the headlamp is illuminated is determined from an output from the lighting switch 11. Then, if it is being illuminated, the flow moves to step 109. On the other hand, if it is not illuminated, the flow returns to step 102.

At step 109, whether the vehicle is being at a stop or running is determined from an output from the vehicle speed sensor 12. If it is at a stop, the flow moves to step 111, but if it is running, the interval timer is reset at step 110, and thereafter the flow returns to step 102.

At step 111, whether or not the pitch angle of the vehicle has changed from the result $\Delta\theta$ of calculation at step 104 (a variation in absolute pitch angle) is determined. If the vehicle pitch angle has changed, a difference d1 (=$\theta B+\Delta\theta-\theta b$) is calculated at step 112. The value ($\theta b+\Delta\theta$) is obtained by adding the result (a variation in absolute pitch angle) $\Delta\theta$ of the calculation carried out at step 104 to the previous vehicle pitch angle $\theta B$ based on the control line (for example, B) stored in the storage part 20, which was used previously. The result $\theta b$ is calculated at step 105 (the vehicle pitch angle obtained from the control line B). The flow then moves to step 113.

At step 113, a difference d2 (=$\theta B+\Delta\theta-\theta c$) is calculated. The value ($\theta b+\Delta\theta$) is obtained by adding the result (a variation in absolute pitch angle) $\Delta\theta$ of the calculation carried out at step 104 to the previous vehicle pitch angle $\theta B$ based on the control line B stored in the storage part 20, which was used previously. The result $\theta c$ is calculated at step 106 (the vehicle pitch angle obtained from the control line C). The flow then moves to step 114.

At step 114, the magnitude of the differences d1, d2 between the pitch angles obtained respectively at step 112, 113 or whether or not d1>d2 is determined. If d1>d2, the flow moves to step 115 to select the control line C. The flow then moves to step 120 via interval-related steps 117 to 119.

At step 120, the pitch angle $\theta c$ calculated from the selected control line C is selected. At step 121, the pitch angle $\theta c$ calculated from the control line C selected at step 120 is stored in the storage part 20. The pitch angle $\theta c$ stored in the storage part 20 at step 121 becomes a previous vehicle pitch angle by the following routine. At step 122, the absolute pitch angle calculated from the output from the auxiliary sensor 15 at step 103 is stored in the storage part 20. The absolute pitch angle stored in the storage part 20 at step 122 becomes the result of the previous calculation by the auxiliary sensor by the following routine. At step 123, the CPU 16 outputs to the motor driver 18 so as to cancel an inclination corresponding to the relative pitch angle $\theta c$ calculated from the control line C selected at step 120, and the motor 10 is activated to operate for 10 seconds.

On the other hand, at step 114, if d1>d2, the flow moves to step 116, where the control line B is selected. The flow advances to step 120 via the interval-related steps 117 to 119. At step 120, the pitch angle $\theta b$ calculated from the selected control line B is selected. At step 121, the pitch angle $\theta b$ calculated from the control line B selected at step 120 is stored in the storage part 20. The pitch angle $\theta b$ stored at step 121 becomes a previous vehicle pitch angle by the following routine. At step 122, the absolute pitch angle calculated from the output from the auxiliary sensor 15 at step 103 is stored in the storage part 20 as the result of the previous calculation by the auxiliary sensor 15 is stored in the storage part 20. The absolute pitch angle stored in the storage part 20 at step 122 becomes the result of the previous calculation by the auxiliary sensor 15 by the following routine. At step 123, the CPU 16 outputs to the motor driver 18 so as to cancel an inclination corresponding to the relative pitch angle $\theta b$ calculated from the control line C selected at step 120, and the motor 10 is activated to operate for 10 seconds.

The previous vehicle pitch angle referred to at step 121 means the vehicle pitch angle used to operate the actuators during the previous movement (the movement 10 seconds before) while the actuators operate at intervals of 10 seconds while the vehicle is at a stop.

The interval-related steps 117 to 119 are constructed as follows. At step 117, the interval timer starts to count. At step 118, whether or not the interval time (10 seconds) has elapsed is determined. If 10 seconds has elapsed, the interval timer is reset at step 119, and thereafter the flow moves to step 120. On the contrary, if 10 seconds has not elapsed at step 118, then the flow returns to step 102.

In addition, if the vehicle pitch angle has not changed at step 111, the flow then moves to step 120 via the interval-related steps 117 to 119, but since the control line has not changed, the pitch angle is not changed at step 120. Therefore, even if a driving control signal is outputted to the motor 10 at step 123, the motor 10 does not operate.

While the interval-related steps (steps 117 to 119) are provided prior to the step 120 in the aforesaid embodiment, those interval steps (steps 117 to 119) may be provided between steps 109 to 111.

Figure 4:
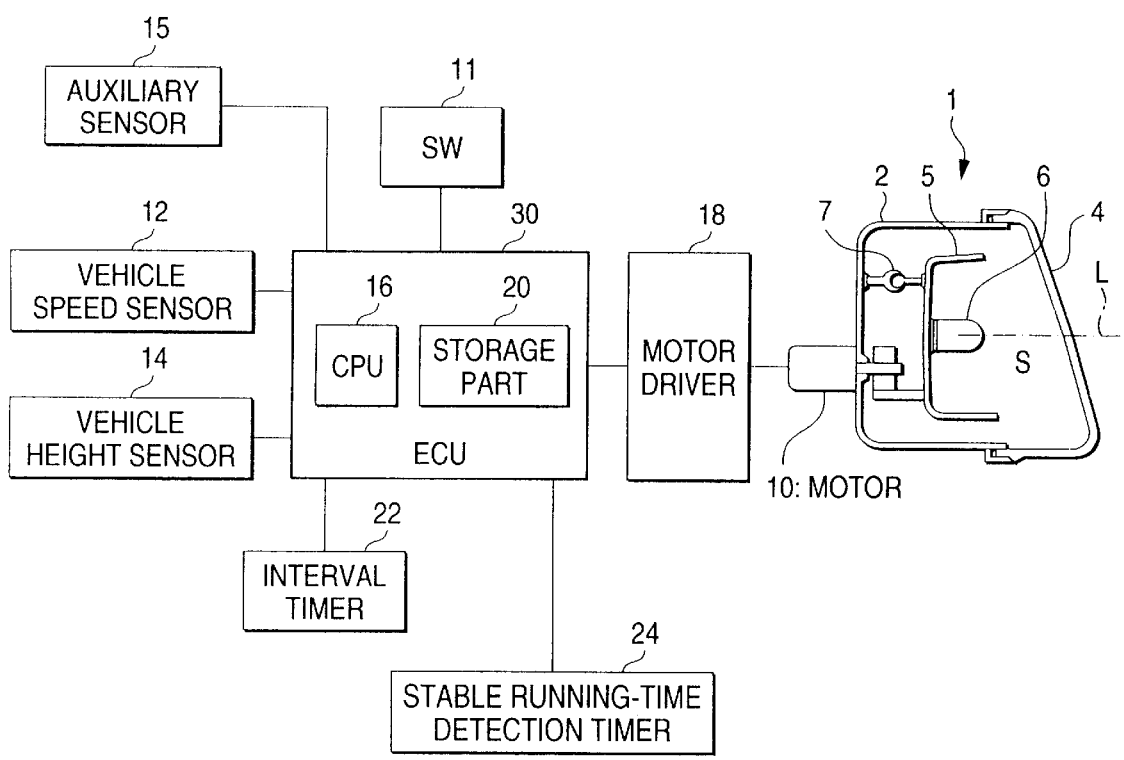
FIG. 4 is a diagram showing a vehicle headlamp leveling device according to an embodiment of the invention.
Figure 5:
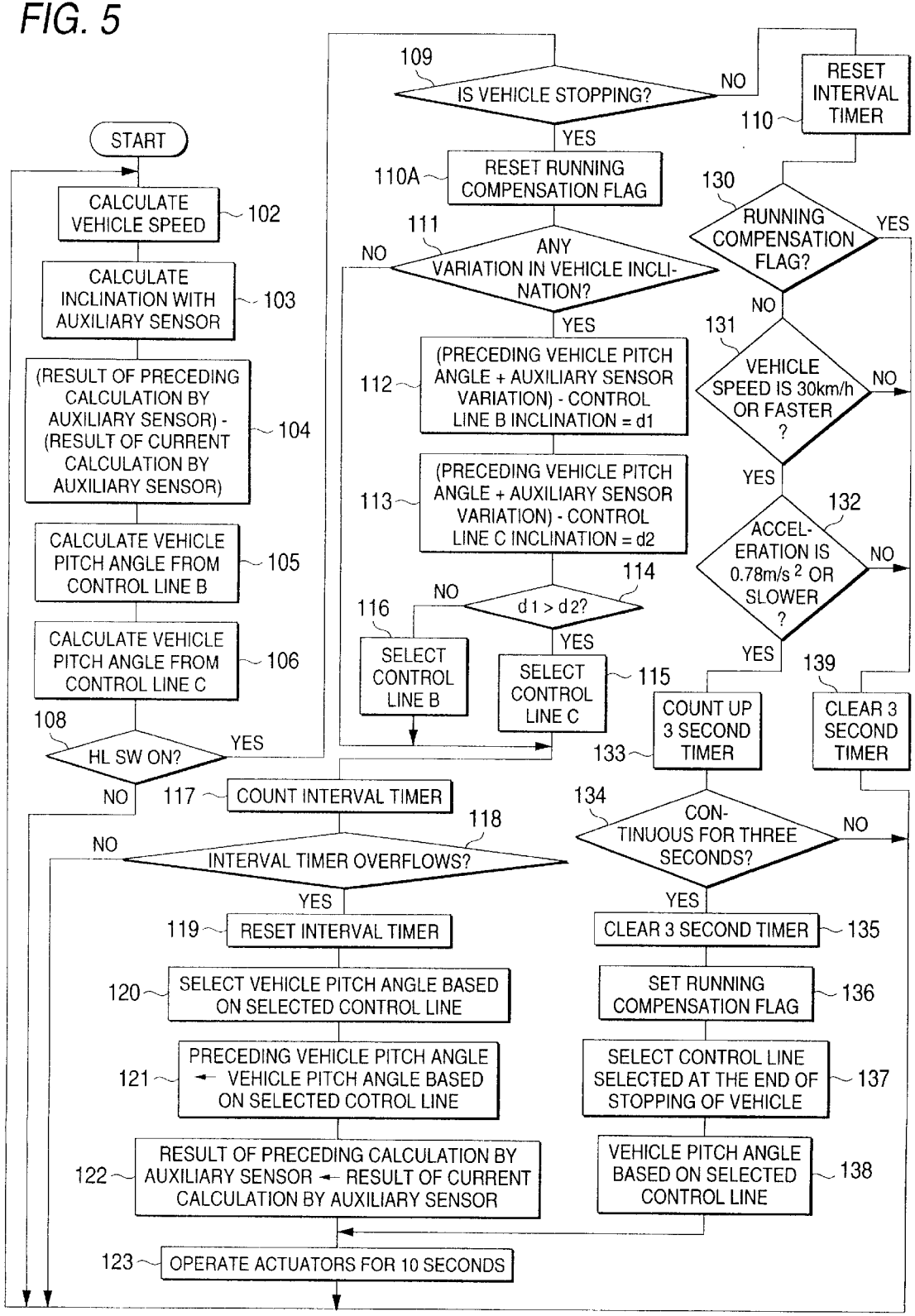
FIG. 5 is a flowchart showing a process flow of motor control by a control part of the vehicle headlamp leveling device according to an embodiment of the invention.

FIGS. 4 and 5 show a second embodiment of the invention, in which FIG. 4 is a diagram showing the overall construction of a vehicle headlamp leveling device according to the second embodiment of the invention. FIG. 5 is a diagram showing a flowchart of a CPU that is an operation control unit for the device.

In the first embodiment, while the leveling of the headlamps (the compensation of the optical light axes) is arranged to be carried out only when the vehicle is at a stop. In the second embodiment, the leveling of the headlamps (the compensation of optical light axes of the headlamps) is arranged to be carried out only once even when the vehicle is running, provided that the vehicle runs in a stable fashion.

In the aforesaid embodiment, the CPU 16 controls the driving of the actuators 10 based on the pitch angle data detected by the vehicle height sensor 14 while the vehicle is at a stop. However, the automatic leveling of the headlamps is designed to take place only when the vehicle is at a stop, and this may result in leveling of the headlamps (or compensation the optical light axes) based on pitch angle data detected while the vehicle is inappropriately stopped as such as being on a slope or with a wheel or wheels riding on a curb.

To address this, in this embodiment, a stable running time detecting timer 24 is provided for detecting the time the vehicle stably runs, as shown in FIG. 4. Also, the CPU 16 is designed to perform only while the vehicle runs stably and only once, controlling the actuators 10 based on pitch angle data calculated from a control line selected previously while the vehicle was at a stop, to compensate for the erroneous leveling (or compensating the optical light axes) of the headlamps. If the pitch angle data detected while the vehicle is at a stop is appropriate (i.e., if the vehicle is stationary inappropriately such as on a slope or with the wheel or wheels riding on a curb), pitch angle data detected while the vehicle runs stably should be substantially equal to pitch angle data detected while the vehicle is at a stop. Therefore, the positions of the optical light axes of the headlamps resulting after the leveling thereof is carried out based on the pitch angle data detected while the vehicle runs stably should substantially be the same as those of the optical light axes of the headlamps resulting after the last leveling of the headlamps is carried out while the vehicle was at a stop.

Additionally, the CPU 16 detects signals from the vehicle height sensor 14 at all times, and performs operation at a relatively fast sampling time (100 ms) for calculating the pitch angle data. Then, while the vehicle is at a stop, the CPU 16 controls the driving of the actuators 10 based on the pitch angle data every time an interval time of 10 seconds elapses, whereas while the vehicle is running, in order to eliminate disturbance factors, the CPU 16 controls the driving of the actuators 10 only in a state in which the vehicle speed is equal to or more than a reference value, the acceleration is equal to or less than a reference value, and such a state (in which the vehicle speed is equal to or more than a reference value and the acceleration is equal to or less than a reference value) continues for a given length of time or more.

The vehicle may not be able to run at more than 30 km/h on rough roads having disturbance factors such as road surface irregularities, and in order to eliminate drastic acceleration or deceleration which changes the posture of the vehicle, it is appropriate that the acceleration should be limited to 0.78 m/s$^2$ or lower. Thus, a stable running condition is set as a continuation of a state in which the vehicle speed is 30 km/h or faster and the acceleration is 0.78 m/s$^2$ or lower for three or more second. The calculation of the pitch angle of the vehicle is designed to be made only when this condition is satisfied, so that an abnormal value is not detected abruptly or the abrupt detection of such an abnormal value does not substantially affect the performance of the vehicle. Whether or not this stable running condition continues for three seconds is determined by counting the stable running time detection timer with the CPU 16 when the state is detected in which the vehicle speed is 30 km/h or faster and the acceleration is 0.78 m/s$^2$ or slower.

With this second embodiment, what is mainly different from the process flow described in the fist embodiment resides only in a process flow during the running of the vehicle (step 130 to step 138), and the other processing steps of the second embodiment remain the same as those of the first embodiment. Therefore, only this different process flow will be described here and the description of the other processing steps will be omitted. Like reference numerals are associated with the processing steps.

Namely, at step 109, if the vehicle is at a stop, a running compensation flag is reset at step 110. Thereafter, the flow moves to step 111. Steps 111 to 123 remain the same as those of the process flow of the first embodiment. On the other hand, if the vehicle is running at step 109, the interval timer is reset at step 110, where whether or not the running compensation flag is reset (or whether or not the optical light axes of the headlamps have been compensated, or whether or not the leveling of the headlamps has been performed) while the vehicle is running is determined. If the running compensation flag is determined not to have been set (or in a case where the compensation of the optical light axes of the headlamps or the leveling of the headlamps has not been carried out), whether or not the vehicle speed is equal to or more than the reference value (30 km/h) is determined at step 131. If the vehicle speed is determined to be equal to or faster than 30 km/h, whether or not the acceleration is equal to or more than the reference value (0.78 m/s$^2$) is determined at step 132. If the acceleration is determined to be equal to or less than 0.78 m/s$^2$) at step 132, the stable running time detection timer 24 is started to be counted at step 133. At step 134, whether or not the state in which the vehicle speed is 30 km/h or faster and the acceleration is 0.78 m/s$^2$ or slower continues for the given length of time (three seconds) or longer is determined.

If the state in which the vehicle seed is 30 km/h or faster and the acceleration is 0.78 m/s$^2$ or slower continues for three or more seconds at step 134, then the flow moves to step 135, where the stable running time detection timer 24 is reset. Thereafter, the flow advances to step 136 to set the running compensation flag. At step 137, the control line (B or C), which is selected at the end of the stopping of the vehicle, is selected, and then the flow moves to step 138. At step 138, a pitch angle is calculated based on the control line (B or C) selected at step 137. At step 123, the CPU 16 outputs to the motor driver 18 so as to operate the motors 10 for ten seconds such that an inclination corresponding to this calculated pitch angle is cancelled. This corrects the automatic headlamps leveling made based on an inappropriate pitch angle resulting when the vehicle is stopped with the wheel or wheels thereof riding on curbs, for example.

If the running compensation flag is reset (the compensation of the optical light axes of the headlamps or the leveling of the headlamps has been carried out while the vehicle has run) at step 130, or the vehicle speed is less than 30 km/h and the acceleration is over 0.78 m/s$^2$ at step 131, 132, respectively, the counting of the stable running time detection timer 24 is cleared at step 139. The flow then returns to step 102.

In addition, if the vehicle speed is 30 km/h or faster and the acceleration is 0.78 m/s$^2$ or slower, but such states do not continue for three or more seconds at step 134, then the flow returns to step 102 without driving the motors 10.

Note that while the running condition is set such that the vehicle speed is 30 km/h or faster, the acceleration is 0.78 m/s$^2$ or slower and they continue for three or more seconds in the embodiment, the invention is not limited to this condition.

In addition, while the interval (time) of the actuators 10 is described as being 10 seconds in the above two embodiments, the invention is not limited to 10 seconds, and it may optionally be set relative to the maximum driving time of the actuators.

Furthermore, while the auxiliary sensor 15 for detecting a variation in the absolute pitch of the vehicle is described as being constituted by the gyro in the embodiments, the invention is not limited to the construction, and any means can be used as an angular acceleration detecting means, provided that the means can detect a variation in the absolute pitch angle of a vehicle.

Moreover, while the optimum pitch angle is obtained based on the two control lines B, C having the different inclinations in the embodiments, an optimum pitch angle may be based on three control lines having different inclinations (for example, the control lines A, B, C as shown in FIG. 2) or a greater number of control lines. As the number of control lines increases, the accuracy of pitch angle data obtained increases.

In addition, while the automatic leveling of the reflector moveable-type headlamp in which the reflector 5 is provided in such a manner as to be tilted relative to the lamp body 2 fixed to the body of the vehicle is described in the embodiments, the invention can equally be applied to a unit movable-type headlamp in which a unit comprising a lamp body and a reflector is provided in such a manner as to be tilted relative to a lamp housing fixed to the body of the vehicle.

As has been described heretofore, according to the first embodiment of the invention, since the pitch angle data closer to the actual vehicle posture is used as control data for controlling the driving of the actuators, highly accurate automatic headlamps leveling can be provided.

According to the second embodiment of the invention, where automatic headlamps leveling is carried out with the vehicle height sensor being provided on the rear suspension, highly accurate automatic headlamps leveling can be provided.

According to the third embodiment of the invention, the automatic headlamp leveling resulting when the vehicle is stopped with the wheel or wheels thereof riding on curbs can be rectified to an appropriate one.

According to the fourth embodiment of the invention, since the auxiliary sensor is integrated into the ECU, the construction of the device can be simplified, and therefore the assembling thereof to the vehicle body is facilitated.

Several embodiments of the invention have been described herein, but it should be understood that various additions and modifications could be made which fall within the scope of the following claims.

What is claimed is:

1. A vehicle headlamp leveling device comprising:
headlamps adapted to be driven by actuators such that an optical light axis of each headlamp is tilted up and/or down relative to the body of a vehicle;
a vehicle speed sensor provided on the body;
a vehicle height sensor provided on either a left or right suspension at either front or rear of the vehicle for detecting a distance between an axle and the body;
a storage part arranged to have control data stored in advance, said control data correlating an output from said vehicle height sensor with a relative pitch angle of the vehicle relative to a road surface, said control data represented by at least two or more control lines with different slopes;
an auxiliary sensor provided on the body for detecting an absolute pitch angle of the vehicle relative to a horizontal plane and a variation in the absolute pitch angle; and
an operation control part for determining whether the vehicle is at a stop or moving and controlling said actuators based on an output from said vehicle speed sensor and said control data stored in said storage part, such that light axes of said headlamps stay in a predetermined inclined state relative to the road surface;
wherein said operation control part compares a difference between a variation added pitch angle obtained by adding the variation in the absolute pitch to a relative pitch angle calculated from a pre-selected control line and a relative pitch angle calculated from respective control lines based on a current output from said vehicle height sensor, selects a control line that minimizes said difference, and controls the driving of said actuators based on a relative pitch angle calculated from said control line so selected.

2. The leveling device of claim 1, wherein said vehicle height sensor is provided on one of the rear suspensions, and wherein said control data comprises two control lines representing two cases where a load is placed in the vehicle and where no load is placed in the vehicle, respectively.

3. The leveling device of claim 1, wherein while the vehicle is moving, said operation control part is adapted to control said actuators only when a vehicle speed is equal to or greater than a given value and an acceleration is equal to or smaller than another given value.

4. The leveling device of claim 3, where said operation control part is adapted to control said actuators uses a relative pitch angle calculated from a control line selected last when the vehicle was stationary.

5. The leveling device of claim 1, wherein said operation control part, said storage part, and said auxiliary sensor are incorporated as part of an electronic control unit comprising a CPU, RAM and ROM.

6. A vehicle headlamp leveling device comprising:
a headlamp for a vehicle adapted to be driven by an actuator;
a height sensor for detecting a change in the height of a vehicle;
a storage part arranged to store data represented by at least two or more control lines with different slopes correlating an output from the height sensor with a relative pitch angle of the vehicle relative to a road surface; and
a control member for taking a difference between a first angle and a second angle, wherein the first angle is obtained by adding an angle of variation in an absolute pitch angle of the vehicle relative to a horizontal plane to an angle calculated from a pre-selected control line, and the second angle is calculated from a control line based on a current output from the height sensor; selecting a control line that minimizes the difference; and controlling the actuator based on a relative pitch angle calculated from the control line so selected.

7. The leveling device of claim 6 wherein while the vehicle is moving, the control member is adapted to control the actuator only when a vehicle speed is equal to or greater than a given value and an acceleration is equal to or smaller than another given value.

8. The leveling device of claim 6 wherein the control member is arranged to determine whether the vehicle is at a stop or moving.

9. The leveling device of claim 6 wherein the pre-selected control line is a control line selected from a previous leveling operation.

10. The leveling device of claim 6 further comprising:
a sensor for measuring the speed and acceleration of the vehicle.

11. The leveling device of claim 6 further comprising:
a auxiliary sensor for detecting the variation in the pitch angle of the vehicle relative to the horizontal plane.

* * * * *